Sept. 10, 1935.   W. KLOCKE   2,014,234

CLUTCH MECHANISM

Filed May 4, 1934

Patented Sept. 10, 1935

2,014,234

UNITED STATES PATENT OFFICE 2,014,234

CLUTCH MECHANISM

William Klocke, Woodhaven, N. Y.

Application May 4, 1934, Serial No. 723,867

15 Claims. (Cl. 192—29)

This invention relates to clutches, and particularly to clutches of the oscillatory-key type, and provides improvements therein.

Clutches of the positive engagement type, are ordinarily used under conditions in which the clutch and its parts are subjected to severe shocks and strains. In presses, for example, the conditions of service are severe.

The present invention provides improved mechanism in which the shock of impact between the parts of the clutch operating mechanism is much reduced, and the liability to breaking and deformation greatly lessened.

The invention provides a clutch-operating mechanism by which a braking action may be applied to the driven-part after it is disengaged through the clutch, and is moving under the force of momentum; and also by which a positive stopping of the driven-part may be effected, preceded by said braking action.

The invention further provides a clutch operating mechanism of simple construction and reliable in operation.

Embodiments of the invention are illustrated in the accompanying drawing, wherein Fig. 1 is a section through a press equipped with a clutch according to the present invention, the section being on the line I—I Fig. 2, the clutch-operating mechanism appearing in side elevation, and in the disengaging position of the clutch;

Fig. 2 is a front view of the parts shown in Fig. 1, the fly-wheel pulley (driving part) being in transverse section.

Fig. 3 is a sectional view similar to Fig. 1 with the clutch in the engaged position and with the parts of the clutch operating mechanism in the positions thereof at which the revolving and stationarily-mounted parts initially contact.

Fig. 4 is a transverse section through a press with a second embodiment of the clutch-operating mechanism appearing in side elevation.

Referring to said drawing, numeral 10 designates a driven-part, as for example, the shaft of a press, and 12 a driving-part, as for example a fly-wheel driving pulley. Ordinarily the driven part (press-shaft) 10 is engaged and disengaged once for each complete rotation.

The clutch comprises an oscillatory-key 15 mounted on the driven-part (shaft) 10 and a notch, or notches, 17 in the driving-part 12. In the form of key shown, it is provided at each end with full-round parts 20, 21 journalled partly in a rounded groove 23 in the shaft 10 running the length of the key, and partly in a collar, or collars 25, 27, keyed to the shaft 10 on each side of the fly-wheel 12. The key is provided with an eccentric portion 30, which in the engaged position of the clutch, projects into the notch 17 in the driving part 12, and locks the driving and driven parts together, and which in the disengaging position lies in the groove 23 with its outer face flush with the circumference of the driven-part 10, so that the driving part 12 may turn idly on the driven-part (shaft) 10.

Numeral 35 designates a tail-piece by which the key 15 is turned and which may be formed as part of the key. It is conveniently located partly within a slot 37 in the collar 27, the end-walls 39, 40 of which form abutments with which the tail-piece contacts in the engaged and disengaged positions respectively of the key 15. The tail-piece is normally pressed toward abutment 39 by a spring 42.

Located within the path of the tail-piece 15 is an arm 45, which coacts with said tail-piece to turn the key 15 to disengaging position. The arm 45 and tail-piece 35 are provided with contacting faces 47, 48 which are counter-parts and are so positioned that said counter-faces glide into contact and preferably meet superficially at the time of initial contact; which is the position illustrated in Fig. 3. The counter-faces 47, 48 may have a curvature on a radius from the axis of the shaft 10 and around which the part 12 rotates. The impact between the tail-piece 35 and arm 45 is imparted and received on broad surfaces. Moreover the impact is a glancing one, as the counter-face 47 is moving almost parallel to the counter-face 48 just prior to impact. The shock of impact is lessened, the parts are mechanically well designed to receive the shock, and the liability to breakage minimized.

The arm 45 is yieldable to permit the driving and driven parts 10, 12 to continue to turn together after initial contact of the tail-piece 35 and arm 45 until the disengaging position of the key 15 is reached. The axis on which key 15 oscillates moves in the direction of and exerts a thrust upon the arm 45 during this time. The constructions by which this yielding function may be attained are various. As shown in Figs. 1–3, the arm 45 may be mounted on a slide 50, the movement of which is resisted by a spring 52. This spring 52 also serves to cushion the shock of impact between the tail-piece 35 and arm 45. The slide 50 may be in the form of a simple bolt or rod sliding in arms 53, 54 of a bracket 55 which may be attached to the frame of the press. The slide 50 in the form of a bolt, may be provided with a reduced portion 56 around which the spring 52 is arranged, and forming a shoulder 51 against which one end of the spring abuts. The other end of the spring may bear on the arm 54 of bracket 55.

Means are also preferably provided whereby the counter-faces 47, and 48 may remain in superficial contact during the aforesaid movement of the key 15 to disengaging position after initial contact of tail-piece 35 with arm 45. One means of accomplishing this function is to provide a pivotal connection 57 between the arm 45 and slide 50, as shown in Figs. 1–3.

Means as an abutment 60 on the bracket 55 may also be provided for limiting the movement of the arm 45 to a position corresponding to the disengaged position of the key 15. The abutment 60, through the arm 45, tail-piece 15 and abutment 40 on collar 27, also serves to stop the driven-part 10 in the disengaged position. A stop or projection 62 may be provided on the heel of arm 45 to limit the sliding of the tail-piece 15 on the arm. The projection 62 is preferably so located as to allow a short sliding movement of the face 47 on face 48 after the arm 45 makes contact with abutment 60 so as to apply a frictional brake on the driven-part during its stopping movement where it is disengaged and moving under momentum. The stopping is eased and shock eliminated, or minimized, upon solid resistance to movement being met at the abutments 60, 62, 40.

Suitable means, as a spring 70 and an abutment 72 may be provided for normally pressing and holding arm 45 in a position where face 48 thereon will make superficial contact with face 47 on tail-piece 35 at the time of initial contact between the tail-piece and arm.

A treadle-rod 75 may be suitably attached to the slide 50, by means of which the arm 45 may be moved out of the path of tail-piece 35, so that the key 15 may be moved by spring 42 to engaging position and the driven part 10 locked to the driving part 12. A slot 77 or other suitable means, in the connection between the slide 50 and treadle-rod 75, is preferably provided to save the treadle-rod from the shock imparted to the arm 45 at the moment of impact between the tail-piece 35 and arm, and from the thrust of the tail-piece in the arm.

Another construction by which the yielding function of arm 45 may be attained is shown in Fig. 4. In this embodiment the arm 45 is mounted on a pivot 80 so that it may yield under the thrust imparted by the end of tail-piece 35, a spring mounted abutment 82 opposing the turning of said arm.

*Résumé of operation*

Referring to Fig. 1, the parts are shown as in disengaged position; the driving part 12 (Fig. 2) turns idly around the shaft 10 (driven part) between the collars 25, 27.

To engage the driving part 12 with the driven part 10, the arm 45 is drawn away from the tail-piece 35, through the treadle-rod 75 and the slide 50. This releases the tail-piece 35, whereupon it is turned by the spring 42, coming to rest against the abutment 39, in which position the eccentric portion 30 of the key 15 extends into the notch 17 in the driving part 12, thereby locking the driving and driven parts and putting the press or other machine to which the clutch is applied, in operation.

Meanwhile spring 70 turns the arm 45 to the position shown in Fig. 3, in contact with abutment 72.

The driving and driven parts, turning together around the axis of the shaft 10, revolve the key 15 and tail-piece around the axis of the shaft. As the key 15 in its path of revolution approaches the disengaging position, counter-faces 47, 48 of the tail-piece and arm respectively, glide together. Continued movement of the rotating and revolving parts, carries the axis of the key 15 toward the arm 45, the arm 45 yielding and turning on its pivotal connection 57. During this part of the movement, the counter-faces 47, 48 remain in superficial contact. When the parts have moved to the position shown in Fig. 1 the key 15 has been turned to its disengaging position, and the continued movement of the driven parts (shaft 10, collars 25, 27, etc.) is under such force of momentum as may exist at the time. The driven parts (shaft 10 etc.) are brought to a stop by the braking action resulting from a limited sliding movement of the faces 47, 48, these surfaces being pressed toward one another by the spring 52, with considerable force, and thereby provide considerable friction. When and if the tail-piece 35 strikes the abutment 62 on the heel of the arm 45, any further movement of the driven parts, (shaft 10 etc.) meets solid resistance of the abutments 60, 62, and 40, thus bringing the driven part to a stop. It is to be understood however that presses and the like are customarily provided with independent brakes, timed to act at about the time that disengagement of the driving and driven parts occurs.

The invention may receive other embodiments than those herein specifically illustrated and described.

What is claimed is:

1. In a clutch of the oscillatory-key type, a rotatable part, an oscillatory key having a tail-piece, said key and tail-piece being mounted in said rotatable part and being revoluble around the axis thereof, and an arm for oscillating said key, said arm being movable toward and from the axis of said rotatable part, into and out of the path of said tail-piece, said arm and tail-piece having contacting-faces the contours of which are counter-parts, the tail-piece and arm, in its position toward the axis of said rotatable part, being so positioned that said counter-faces meet superficially at the time of initial contact and the arm moves away from the axis of said rotatable part during the oscillation of said key.

2. In a clutch of the oscillatory-key type, a rotatable part, an oscillatory key having a tail-piece, said key and tail-piece being mounted in said rotatable part and being revoluble around the axis thereof, and an arm located in the path of said tail-piece for oscillating said key, said arm and tail-piece having contacting-faces the contours of which are counter-parts, the tail-piece and arm being so positioned that said counter-faces meet superficially at the time of initial contact, said tail-piece and key being turned by said arm, and said arm being yieldable so that said faces remain in contact during the turning of said tail-piece and key.

3. In a clutch of the oscillatory-key type, a rotatable part, an oscillatory key having a tail-piece, said key and tail-piece being mounted in said rotatable part and being revoluble around the axis thereof, an arm located in the path of said tail-piece for oscillating said key, said arm and tail-piece having contacting-faces the contours of which are counter-parts, the tail-piece and arm being so positioned that said counter-faces meet superficially at the time of initial contact, said arm being pivoted and turning as said key turns, with said faces in contact and resilient-means opposing the thrust of said tail-piece on said arm.

4. In a clutch of the oscillatory-key type, a rotatable part, an oscillatory key having a tail-piece, said key and tail-piece being mounted in said rotatable part and being revoluble around the axis thereof, an arm located in the path of said tail-piece for oscillating said key, said arm and tail-piece having contacting-faces the contours of which are counter-parts, the tail-piece and arm being so positioned that said counter-faces meet superficially at the time of initial contact, said tail-piece and key being turned by said arm, and said arm being yieldable so that said faces remain in contact during the turning of said tail-piece and key, and an abutment limiting the movement of said arm to a position where said key has been turned to disengaging-position.

5. In a clutch of the oscillatory-key type, a rotatable part, an oscillatory key having a tail-piece, said key and tail-piece being mounted on said rotatable part and being revoluble around the axis thereof, an arm located in the path of said tail-piece for oscillating said key, said arm and tail-piece having contacting-faces the contours of which are counter-parts, the tail-piece and arm being so positioned that said counter-faces meet superficially at the time of initial contact, said arm being yieldable so that said faces remain in contact during the turning of said tail-piece and key, and abutments limiting the movements of said arm between a position where said faces make initial contact in the manner aforesaid and where said key has been turned to disengaging position.

6. In a clutch of the oscillatory-key type, a rotatable part, an oscillatory key having a tail-piece, said key and tail-piece being mounted in said rotatable part and being revoluble around the axis thereof, an arm located in the path of said tail-piece for oscillating said key, a slide on which said arm is mounted, and resilient means for resisting the movement of said slide, said arm and tail-piece having contacting-faces the contours of which are counter-parts, the tail-piece and arm being so positioned that said counter-faces meet superficially at the time of initial contact.

7. In a clutch of the oscillatory-key type, a rotatable part, an oscillatory key having a tail-piece, said key and tail-piece being mounted in said rotatable part and being revoluble around the axis thereof, an arm located in the path of said tail-piece for oscillating said key, a slide on which said arm is mounted, and resilient-means for resisting the movement of said slide, said arm and tail-piece having contacting-faces the contours of which are counter-parts, the tail-piece and arm being so positioned that said counter-faces meet superficially at the time of initial contact, said arm being pivotally mounted on said slide, said arm turning and said slide yielding following contact of said arm and tail-piece, so that said counter-faces remain in superficial contact during movement to the disengaging position of the key.

8. In a clutch of the oscillatory-key type, a rotatable part, an oscillatory key having a tail-piece, said key and tail-piece being mounted in said rotatable part and being revoluble around the axis thereof, an arm located in the path of said tail-piece for oscillating said key, a slide on which said arm is mounted, resilient-means for resisting the movement of said slide, said arm and tail-piece having contacting-faces the contours of which are counter-parts, the tail-piece and arm being so positioned that said counter-faces meet superficially at the time of initial contact, said arm being pivotally mounted on said slide, said arm turning and said slide yielding following contact of said arm and tail-piece, so that said counter-faces remain in superficial contact during movement to the disengaging position of the key, and abutments for limiting the pivotal movement of said arm.

9. In a clutch of the oscillatory-key type, a rotatable part, an oscillatory key having a tail-piece, said key and tail-piece being mounted in said rotatable part and being revoluble around the axis thereof, an arm located in the path of said tail-piece for oscillating said key, a slide on which said arm is mounted, resilient-means for resisting the movement of said slide, said arm and tail-piece having contacting-faces the contours of which are counter-parts, the tail-piece and arm being so positioned that said counter-faces meet superficially at the time of initial contact, said arm being pivotally mounted on said slide, said arm turning and said slide yielding following contact of said arm and tail-piece, so that said counter-faces remain in superficial contact during movement to the disengaging position of the key, abutments for limiting the pivotal movement of said arm, and resilient means normally pressing said arm around its pivot to said position where said counter-faces make initial contact.

10. In a clutch of the oscillatory-key type, a rotatable part, an oscillatory key having a tail-piece, said key and tail-piece being mounted in said rotatable part and being revoluble around the axis thereof, and an arm located in the path of said tail-piece for oscillating said key, said arm and tail-piece having contacting-faces the contours of which are counter-parts, the tail-piece and arm being so positioned that said counter-faces meet superficially at the time of initial contact, said tail-piece and key being turned by said arm, and said arm being yieldable so that said faces remain in contact during the turning of said tail-piece and key, said counter-faces having a curvature on a radius from the axis of rotation of said rotatable part.

11. In a clutch according to claim 2 said counter-faces having a curvature on a radius from the axis of rotation of said rotatable part.

12. In a clutch of the oscillatory-key type, a rotatable part, an oscillatory-key having a tail-piece, said key and tail-piece being mounted in said rotatable part and being revoluble around the axis thereof, and an arm located in the path of said tail-piece so as to make end to end contact therewith for oscillating said key, said arm being pivoted, and, in contact with said tail-piece turning as said key turns.

13. In a clutch of the oscillatory-key type, a rotatable part, an oscillatory key having a tail-piece, said key and tail-piece being mounted in said rotatable part and being revoluble around the axis thereof, and an arm located in the path of said tail-piece so as to make end to end contact therewith for oscillating said key, said arm being pivoted, and, in contact with said tail-piece turning as said key turns, and resilient-means opposing the thrust of said tail-piece on said arm.

14. In a clutch of the oscillatory-key type, a rotatable part, an oscillatory key having a tail-piece, said key and tail-piece being mounted in said rotatable part and being revoluble around the axis thereof, and an arm located in the path of said tail-piece for oscillating said key, said arm and tail-piece having contacting-faces the shapes of which are counter-parts, the tail-piece and arm being so positioned that said counter-faces meet superficially at the time of initial contact, said tail-piece and key being turned by said arm, and said arm being yieldable so that said faces remain in contact during the turning of said tail-piece and key, said counter-faces being arranged to slide on one another to provide a braking force.

15. In a clutch of the oscillatory-key type, a rotatable part, an oscillatory key having a tail-piece, said key and tail-piece being mounted in said rotatable part and being revoluble around the axis thereof, and an arm located in the path of said tail-piece for oscillating said key, said arm and tail-piece having contacting-faces which are counter-parts, the tail-piece and arm being so positioned that said counter-faces meet superficially at the time of initial contact, said tail-piece and key being turned by said arm, and said arm being yieldable so that said faces remain in contact during the turning of said tail-piece and key, said counter-faces being arranged to slide on one another to provide a braking force, and a stop on said arm for limiting the sliding movement of said counter-faces.

WILLIAM KLOCKE.